(12) United States Patent
Keita et al.

(10) Patent No.: US 8,590,399 B2
(45) Date of Patent: Nov. 26, 2013

(54) VIBRATION TYPE FLOW MONITORING APPARATUS INCLUDING A SUPPORT PLATE MECHANICALLY COUPLED WITH THE CONDUIT FOR INDIRECTLY SUPPORTING THE TRANSDUCERS TO THE CONDUIT

(75) Inventors: Mamadi Keita, Basel (CH); Mike Touzin, Hollstein (DE)

(73) Assignee: Endress + Hauser Flowtec AG, Reinach (CH)

( * ) Notice: Subject to any disclaimer, the term of this patent is extended or adjusted under 35 U.S.C. 154(b) by 424 days.

(21) Appl. No.: 12/996,139

(22) PCT Filed: Jun. 2, 2009

(86) PCT No.: PCT/EP2009/056727
§ 371 (c)(1),
(2), (4) Date: Dec. 3, 2010

(87) PCT Pub. No.: WO2009/147129
PCT Pub. Date: Dec. 10, 2009

(65) Prior Publication Data
US 2011/0079091 A1    Apr. 7, 2011

(30) Foreign Application Priority Data

Jun. 4, 2008  (DE) .................. 10 2008 002 215

(51) Int. Cl.
*G01F 1/84* (2006.01)
(52) U.S. Cl.
USPC .................. 73/861.355; 73/861.357

(58) Field of Classification Search
None
See application file for complete search history.

(56) References Cited

U.S. PATENT DOCUMENTS

| 4,876,898 | A | * | 10/1989 | Cage et al. .............. 73/861.355 |
| 5,531,126 | A | | 7/1996 | Drahm |
| 6,748,813 | B1 | | 6/2004 | Barger |
| 2005/0155437 | A1 | * | 7/2005 | Bitto et al. .............. 73/861.355 |
| 2007/0151368 | A1 | * | 7/2007 | Hussain et al. .......... 73/861.357 |
| 2009/0266177 | A1 | * | 10/2009 | Hussain et al. .......... 73/861.357 |

FOREIGN PATENT DOCUMENTS

JP    03199922 A    8/1991

* cited by examiner

*Primary Examiner* — Harshad R Patel
(74) *Attorney, Agent, or Firm* — Bacon & Thomas, PLLC

(57) ABSTRACT

An apparatus for determining and/or monitoring of at least one flow parameter of a medium, wherein the medium flows through a measuring unit, wherein at least one exciter transducer element is provided, which, based on an exciter signal, excites the measuring unit to mechanical oscillations, and wherein at least one receiver transducer element is provided, which receives mechanical oscillations of the measuring unit as a received signal. The measuring unit has at least one guiding unit and one carrying unit, the medium flows through the guiding unit, the guiding unit and the carrying unit are mechanically coupled with one another, the receiver transducer element and the exciter transducer element are mechanically coupled with the carrying unit, and the receiver transducer element and the exciter transducer element are mechanically coupled indirectly via the carrying unit with the guiding unit.

13 Claims, 4 Drawing Sheets

VIBRATION TYPE FLOW MONITORING APPARATUS INCLUDING A SUPPORT PLATE MECHANICALLY COUPLED WITH THE CONDUIT FOR INDIRECTLY SUPPORTING THE TRANSDUCERS TO THE CONDUIT

TECHNICAL FIELD

The invention relates to an apparatus for determining and/or monitoring at least one flow parameter of a medium, wherein the medium flows through a measuring unit, wherein at least one exciter transducer element is provided, which, based on an exciter signal, excites the measuring unit to mechanical oscillations, and wherein at least one receiver transducer element is provided, which receives mechanical oscillations of the measuring unit as a received signal.

The flow parameter is, for example, volume or mass flow of the medium. The medium is, for example, a liquid, a gas, generally a fluid, or a bulk good. Furthermore, the medium can be, for example, a mixture of liquid, gas or bulk good.

BACKGROUND DISCUSSION

In the state of the art, it is known to determine flow parameters, e.g. the volume flow rate of a medium through a measuring tube, by taking advantage of the Coriolis effect. For this, the measuring tube is excited to mechanical oscillations. At a point different from the excitation location, the oscillations of the measuring tube are recorded. From the phase difference between the excitation signal and the received signal or the travel time connected therewith, the flow parameter can then be ascertained.

A problem arises when the medium to be measured is very aggressive or abrasive. Such media can, in given cases, lead to the measuring apparatus frequently needing to be replaced. Depending on the diameter of the flowed-through measuring tube, this can be expensive.

SUMMARY OF THE INVENTION

An object of the invention is to provide an apparatus for determining and/or monitoring a flow parameter, such that a continuous and cost-saving application is enabled in the case of abrasive or aggressive media.

The object is achieved according to the invention by the features that: The measuring unit has at least one guiding unit and one carrying unit; the medium flows through the guiding unit; the guiding unit and the carrying unit are mechanically coupled with one another; the exciter transducer element and the receiver transducer element are mechanically coupled with the carrying unit; and the exciter transducer element and the receiver transducer element are mechanically coupled indirectly via the carrying unit with the guiding unit. The flow parameter is, in such case, especially measured via the Coriolis measuring principle.

In the case of Coriolis measuring devices of the state of the art, the measuring unit is usually a single tube or two tubes, through which medium flows. The measuring unit is excited to oscillate. In the state of the art, the measuring unit thus performs both the task of guiding the medium, as well as also the task of the carrier of the oscillations. The invention entails separating these two tasks and making from the measuring unit of the state of the art two units, wherein the guiding unit serves for guiding the medium and the carrying unit for creating the possibility for oscillations. For each functional task there is thus one unit.

The transducer units for producing or receiving the oscillations are, in such case, mechanically coupled essentially directly with the carrying unit, and indirectly with the guiding unit via the carrying unit. The transducer units thus excite the carrying unit to oscillations, or receive these oscillations from this. The oscillations are, in such case, transmitted through a corresponding mechanical coupling from the carrying unit to the guiding unit, and are thus also dependent at least upon the one flow parameter of the medium in the guiding unit. Since, in the state of the art, there is no separation into guiding unit and carrying unit and, respectively, no allocation of the two particular functions associated therewith to the two respective independent units, in the state of the art, there is a direct coupling between the transducer units and the unit serving in the state of the art both for guiding the medium and for carrying the oscillations.

This separation into two units thus especially permits the guiding unit to be embodied corresponding to the properties of the medium, and the carrying unit simultaneously to be optimized as regards the production or the reception of oscillations. In an embodiment, the guiding unit is especially composed of an especially flexible synthetic material, or generally has the properties of a fabric. In an embodiment, the guiding unit is especially a fire hose.

Thus, the guiding unit is preferably composed of cost effective materials, so that a replacement can be carried out correspondingly easily. The guiding unit can especially be composed of renewable materials.

In an embodiment, the frequency of the oscillations is less than 50 Hz and especially less than 10 Hz, In an additional embodiment, the amplitude of the oscillations is relatively large and, in one embodiment, especially reaches half the greater diameter of the guiding unit. If the guiding unit has a circularly shaped, tube cross section, it is then thus provided in an embodiment that the amplitude of the oscillations can be in the order of magnitude up to half the diameter. Corresponding considerations hold for oval cross sections.

An embodiment provides that the guiding unit has a lesser mechanical stiffness than the carrying unit.

An embodiment provides that the guiding unit and the carrying unit are embodied and connected with one another in such a manner, that an essentially uniform stiffness distribution exists. In this embodiment, thus the oscillator formed from the guiding unit and the carrying unit has especially a continuous structure. Thus, for example, the stiffness is uniformly distributed.

An embodiment includes that the guiding unit is embodied essentially tubularly. In such case, the guiding unit is especially embodied in the manner of a hose.

An embodiment includes that the guiding unit has an essentially circularly shaped or oval cross section.

An embodiment provides that the carrying unit is embodied in an essentially plate-like manner. In an embodiment, the carrying unit is, in such case, essentially flat.

An embodiment includes that the guiding unit is arranged on the carrying unit. This is true especially for the carrying unit embodied in a plate-like manner, on or against which the guiding unit is suitably installed.

An embodiment provides that the exciter transducer element and/or the receiver transducer element are/is arranged on the side of the carrying unit facing away from the guiding unit. The transducer element is thus located, for example, beneath the carrying unit or on the rear side thereof.

An embodiment includes that the carrying unit is embodied essentially helically.

An embodiment provides that the carrying unit surrounds the guiding unit. In one variant, the spiral encircles the guiding unit, which, for example, is composed of a synthetic material or of a weave. The spiral can also be at least sectionally worked into the guiding unit.

An embodiment includes that the guiding unit and/or the carrying unit are/is embodied in such a manner, that the medium flows through the guiding unit essentially in the direction of the force of gravity. The options for securement of the carrying unit are correspondingly embodied for this, or such results from the orientation of the guiding unit and carrying unit to one another.

An embodiment provides that the frequency of the exciter signal is different from the resonance frequency of the measuring unit, and/or that the frequency of the exciter signal is set to an essentially constant value independent of the medium. The frequency is thus, for example, predetermined so as to be constant, and experiences no matching to the medium to be measured. Alternatively formulated: The frequency of the exciter signal is, independently of the medium, essentially held to a constant value. Thus is also covered the case, where, as a matter of coincidence, the constant frequency is equal to the resonance frequency of the system of measuring unit and medium.

Such an embodiment, in the case of which the resonance frequency is not tuned in, simplifies the building of the electronics. Especially if the medium to be measured is a bulk good, this embodiment with a constant excitation frequency then also takes into consideration that the degree of filling of the guiding unit is not always known, or is not necessarily constant. In contrast to measuring devices, in which the resonance frequency of the system consisting of the oscillatable unit and medium is used for the exciter signal, in this embodiment, a constant frequency, which especially can be different from the resonance frequency, is used for all applications.

An embodiment includes that the exciter signal is embodied in such a manner, that the exciter transducer element excites the measuring unit to oscillations above the fundamental mode, especially above mode 2 ($2^{nd}$ harmonic). In order to better balance the oscillatory behavior, oscillations above the fundamental mode (=mode 1) and especially larger than mode 2, and thus at least equal to mode 3, are excited.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
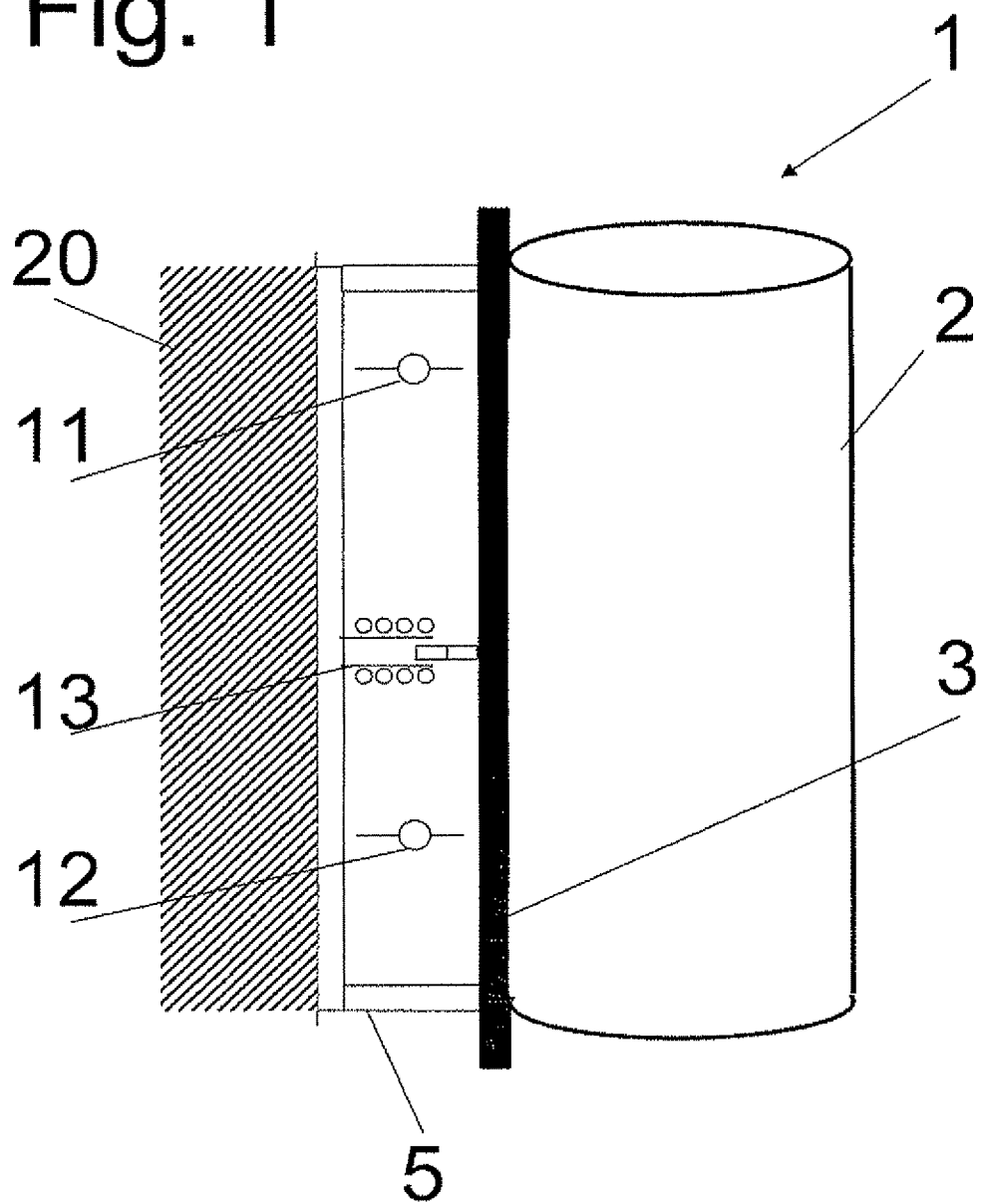
FIG. 1 is a schematic representation of a first variant of the measuring device of the invention.

FIG. 1 shows schematically an embodiment of the measuring device of the invention. The measuring unit 1 is secured here in such a manner, that it is flowed through by the medium in the direction of the force of gravity. A vertical orientation is thus present. Measuring unit 1 is composed, in this case, essentially of a guiding unit 2 and a carrying unit 3. The medium flows in this embodiment through the guiding unit 2 and not through the carrying unit 3. The guiding unit 2 is constructed tubularly, wherein, here, the cross section is ovular, and the longer principal axis of the oval is perpendicular to the plane of the carrying unit 3. In an alternative embodiment, the oval lies with its longer main axis parallel to the plane of the carrying unit 3. In another embodiment, the cross section of the guiding unit 2 is circular. The guiding unit 2 is formed, for example, from a preferably elastic, synthetic material or is composed essentially of a woven material, which is, for example, embodied in a liquid-tight manner. In an embodiment, the guiding unit 2 is embodied in the manner of a fire hose. The guiding unit 2 is especially embodied in such a manner, that it also resists an aggressive or abrasive medium well, or, alternatively or supplementally, is correspondingly cost effective, so that frequent replacement is possible.

The guiding unit 2 serves, in such case, essentially to convey the medium. Therefore, the guiding unit 2 can, for example, also have a very low stiffness, i.e., as regards its oscillation characteristics, it can, de facto, be embodied very disadvantageously. In an embodiment, especially only one guiding unit 2 is provided, so that the system is thus a one-tube measuring system.

The carrying unit 3 is here essentially embodied in the form of a plate. The guiding unit 2 is, in such case, connected with the carrying unit 3 at least at one point. In an embodiment, the guiding unit 2 is connected with the carrying unit 3 at least at two points and, indeed, preferably at the in- and outflow regions of the guiding unit 2, i.e. in the vicinity of the regions at which the transition between the measuring unit 1 and the pipe system or medium guiding system feeding and draining the measuring unit 1 takes place. Beneath the carrying unit 3 and, thus, on its side facing away from the guiding unit 2, a support structure 5 is provided. This support structure 5 is embodied, for example, in the form of a housing, of which one side is closed off with the carrying unit 3. Via the support structure 5, the carrying unit 3 is here also connected with a wall 20 in such a manner, that the medium flows through the guiding unit 2 in the direction of the force of gravity. On the side of the carrying unit 3 facing away from the guiding unit 2 are located the two receiving transducer elements 11, 12 and the exciter transducer element 13. The receiving transducer elements 11, 12 are, for example, piezoelectric elements or optical sensors, which detect the oscillations and convert them into electrical signals. From the phase difference of the respective electrical signals, for example, the mass flow of the medium in the guiding unit 2 can then be determined. The exciter transducer element 13 is, for example, an electromechanical transducer.

The carrying unit 3 has a markedly higher stiffness than the guiding unit 2. For example, the carrying unit 3 is a wood plate.

Figure 2A:
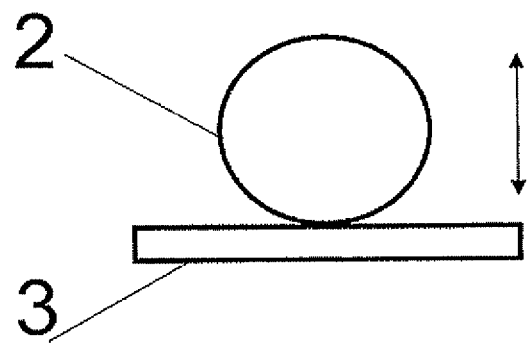
FIG. 2a and FIG. 2b show two embodiments of the cross section of the tubular guiding unit of a measuring device of the invention.
Figure 2B:
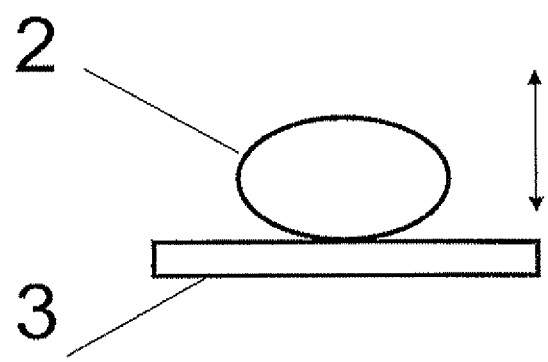

In FIGS. 2a and 2b, two variants for the cross section of the guiding unit 2 are presented. FIG. 2a shows a circularly shaped cross section and FIG. 2b an oval cross section. In both embodiments, the guiding unit 2 rests on the planar carrying unit 3, which, for example, is embodied in the form a metal plate. The arrows illustrate the oscillatory movement, which, in each case, is perpendicular to the plane of the plate-like carrying unit 3. The oval embodiment of the guiding unit 2—in FIG. 2b—produces a preferential direction of the oscillations. By the plate-like embodiment of the carrying unit 3, however, a preferential direction is already predetermined and, indeed, perpendicular to the plate surface (the transducer elements—not shown here—are located below the carrying unit 3 and preferably have a direction of movement perpendicular to the plane of the carrying unit 3). Such an oval or flattened embodiment is, thus, especially advantageous when a preferred oscillation direction is not, for example, already defined by the embodiment of the carrying unit 3.

Figure 3:
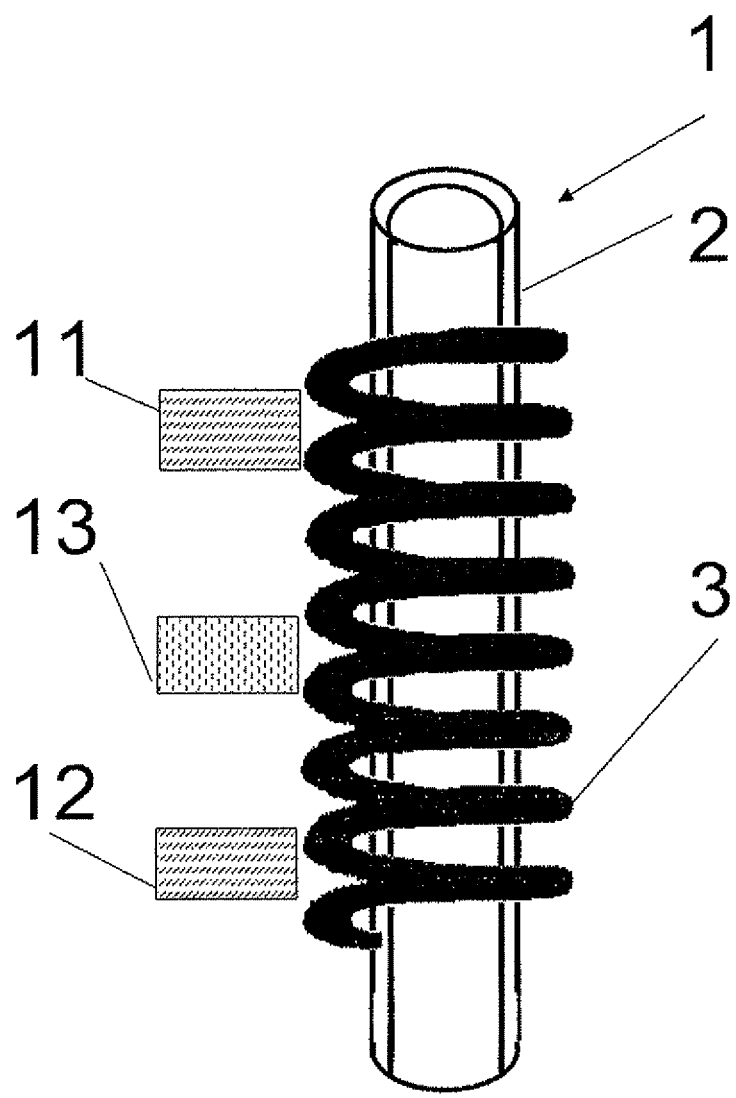
FIG. 3 is a schematic representation of a second variant of a measuring unit of the invention.

FIG. 3 shows a second embodiment of the measuring unit 1. The guiding unit 2 is here—as in FIG. 1—embodied tubularly and has an oval cross section. In such case, the major axis of the oval is arranged essentially parallel to the plane of the transducer elements 11, 12 and 13. This supports oscillation of the measuring unit 1 preferentially in the direction of the minor axis of the oval and, thus, in the direction of the oscillations of the transducer elements 11, 12 and 13. By appropriate choice of the geometry of the measuring unit 1, its oscillatory movement can thus be controlled. The carrying unit 3 is, in contrast, however, provided with a helical shape, wherein the carrying unit 3 encircles the guiding unit 2 and thus supports it. The carrying unit 3 in this way especially also provides for a constant diameter of the guiding unit 2. The three transducer elements 11, 12 and 13 are here installed on the carrying unit 3. In an alternative embodiment, the carrying unit 3 is a component of the guiding unit 2.

In an additional embodiment, the carrying unit 3 is composed both of a helical structure, which surrounds the guiding unit 2, as well as a plate-like structure, against which the guiding unit 2 rests.

The invention claimed is:

1. An apparatus for determining and/or monitoring at least one flow parameter of a medium, which medium flows through a measuring unit, said apparatus comprising:
   at least one exciter transducer element, which, based on an exciter signal, excites the measuring unit to mechanical oscillations; and
   at least one receiver transducer element is provided, which receives mechanical oscillations of the measuring unit as a received signal, wherein:
   the measuring unit includes at least one guiding unit and one carrying unit, with the medium flowing through said guiding unit,
   said guiding unit and said carrying unit are mechanically coupled with one another,
   said receiver transducer element and said exciter transducer element are mechanically coupled with said carrying unit; and
   said receiver transducer element and said exciter transducer element are mechanically coupled indirectly via said carrying unit with said guiding unit; and
   frequency of said exciter signal is different from the resonance frequency of the measuring unit.

2. The apparatus as claimed in claim 1, wherein:
said guiding unit exhibits a smaller mechanical stiffness than said carrying unit.

3. The apparatus as claimed in claim 1, wherein:
said guiding unit and said carrying unit are embodied and connected with one another in such a manner, that essentially a uniform stiffness distribution exists.

4. The apparatus as claimed in claim 1, wherein:
said guiding unit is embodied essentially tubularly.

5. The apparatus as claimed in claim 4, wherein:
said guiding unit has an essentially circularly shaped or oval cross section.

6. The apparatus as claimed in claim 1, wherein:
said carrying unit is embodied in the form of a plate.

7. The apparatus as claimed in claim 6, wherein:
said receiver transducer element and/or said exciter transducer element are/is arranged on the side of said carrying unit facing away from said guiding unit.

8. The apparatus as claimed in claim 1, wherein:
said guiding unit is arranged on said carrying unit.

9. The apparatus as claimed in claim 1, wherein:
said carrying unit is embodied essentially helically.

10. The apparatus as claimed in claim 9, wherein:
said carrying unit surrounds said guiding unit.

11. The apparatus as claimed in claim 1, wherein:
said guiding unit and/or said carrying unit are/is embodied in such a manner, that the medium flows through said guiding unit essentially in the direction of the force of gravity.

12. The apparatus as claimed in claim 1, wherein:
the frequency of said exciter signal is set to an essentially constant value independent of the medium.

13. The apparatus as claimed in claim 1, wherein:
the exciter signal is embodied in such a manner, that said exciter transducer element excites the measuring unit to oscillations above the fundamental mode.

* * * * *